UNITED STATES PATENT OFFICE.

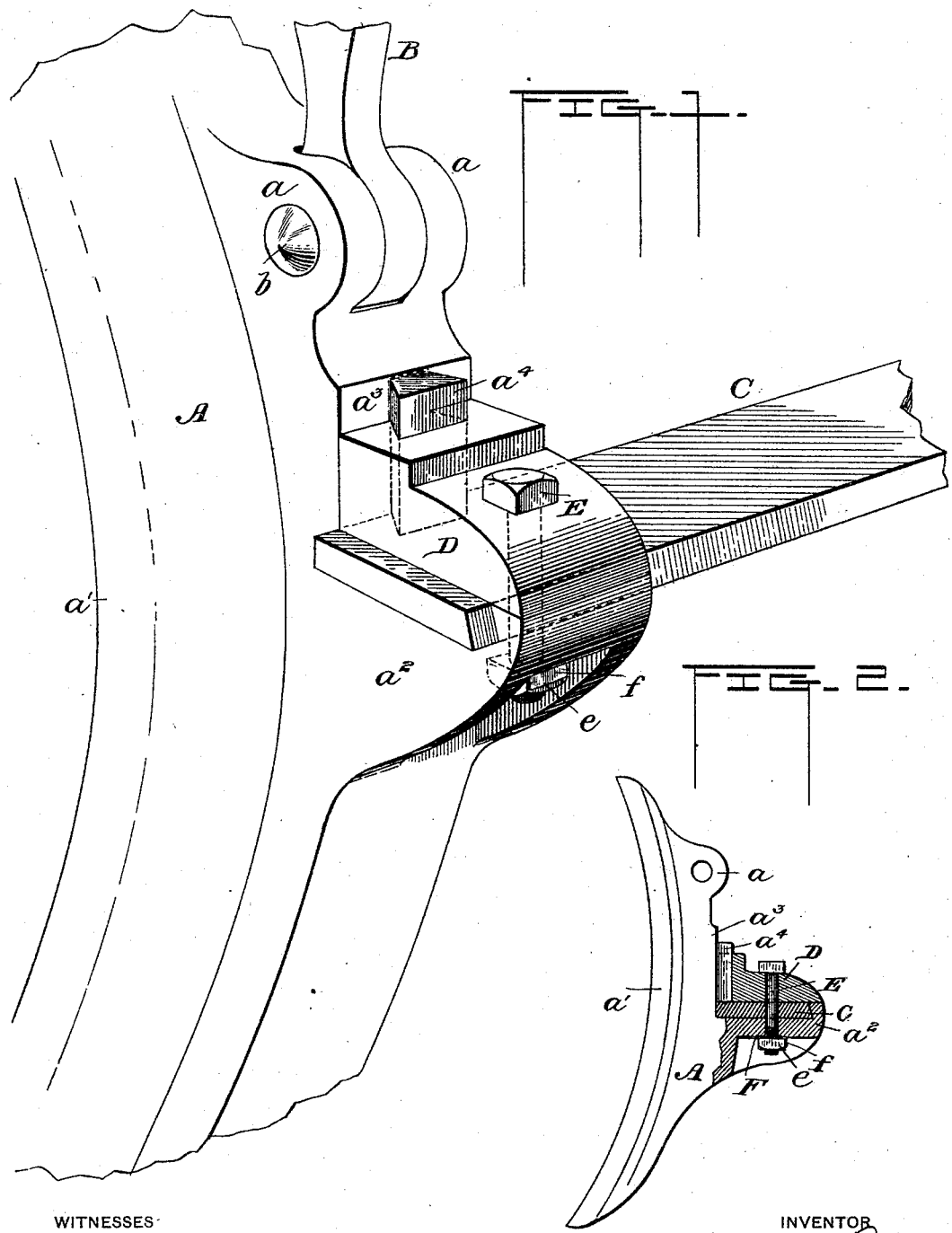

CHRISTIAN FEIL, OF NEW UTRECHT, NEW YORK.

BRAKE-SHOE FASTENING.

SPECIFICATION forming part of Letters Patent No. 458,890, dated September 1, 1891.

Application filed May 27, 1891. Serial No. 394,265. (No model.)

*To all whom it may concern:*

Be it known that I, CHRISTIAN FEIL, a citizen of the United States, residing at New Utrecht, in the county of Kings and State of New York, have invented certain new and useful Improvements in Brake-Shoe Fastenings; and I do declare the following to be a full, clear, and exact description of the invention, such as will enable others skilled in the art to which it appertains to make and use the same, reference being had to the accompanying drawings, and to the letters of reference marked thereon, which form a part of this specificaion.

My invention relates to railway-cars, and has especial reference to the brake-rigging. Its object is to improve the means for fastening the brake-shoe to the brake-beam; and it consists in the construction hereinafter set forth, and particularly pointed out in the claims.

In the accompanying drawings, Figure 1 is a perspective view of a portion of a brake-shoe and beam, showing my improved mode of fastening one to the other. Fig. 2 is a side elevation, partly in section, on a smaller scale.

The brake-shoe A may be of any desired pattern and adapted for use on a car of any kind. It is formed with a pair of ears $a$ or other suitable means for attaching the hanger B, which is shown pivoted between the ears by the transverse bolt $b$. The shoe has a curved face $a'$ to fit the wheel, as usual. At about the middle of its back is a bracket $a^2$, in the upper side of which is a transverse groove shaped to fit the brake-beam C. In the drawings, the beam is shown as a flat bar with a beveled rear edge, and the groove in the bracket $a^2$ is so formed that the beam lies flat, with its upper surface flush with the upper face of the bracket, the rear edge of the groove being undercut to fit the beam. The beam may, however, be of a different cross-section, the groove being suitably altered to receive it.

The brake-shoe is formed with a vertical shoulder $a^3$, rising, preferably, though not necessarily, flush with the forward side of the groove in the bracket $a^2$. Cast with or attached to this shoulder is a vertical dovetailed lug $a^4$. A block D, having a dovetail groove in one end to fit the lug $a^4$ and having its bottom formed to fit the upper surface of the beam C, is slid down upon the lug until it rests upon the beam and bracket, where it is secured by a bolt E passing vertically through suitable holes in the block, beam, and bracket. The under side of the bracket is recessed out to afford a flat seat for the nut $e$, which is locked by a sheet-metal washer F, having a portion $f$ bent down against one side of the nut. The washer is wider than the nut and is prevented itself from turning on the bolt by the depending cheeks of the bracket on either side of the recess. It will be seen that the beam is thus surrounded by a considerable mass of metal, which effectually resists all twisting strains, and that the shoe, though firmly secured to the beam, can nevertheless be readily and quickly removed when necessary.

Having thus described my invention, what I claim, and desire to secure by Letters Patent, is—

1. The combination, with a brake-beam, of a brake-shoe having a bracket containing a groove receiving the beam, a block having its bottom shaped to fit the upper side of the beam and resting upon said beam, and a suitable fastening device uniting the parts, substantially as described.

2. The combination, with a brake-beam, of a brake-shoe provided with a dovetailed lug and with a bracket having a transverse groove receiving said beam, a block resting on the beam and having a dovetailed groove fitting said lug, and a suitable fastening device uniting the parts, substantially as described.

3. The combination, with the brake-shoe A, having the dovetailed lug $a^4$, and the bracket $a^2$, containing a transverse groove in its upper face and a recess in its under side, of the beam C, received in said groove, a block D, having a dovetail groove fitting the lug, and a bolt E, passing through the block, beam, and bracket, and having a nut $e$ received in the recess, substantially as described.

In testimony whereof I affix my signature in presence of two witnesses.

CHRISTIAN FEIL.

Witnesses:
JOHN E. WHITTLESEY,
F. A. NITSCHKE.